United States Patent [19]
Stephens et al.

[11] 3,754,613
[45] Aug. 28, 1973

[54] TILT HOOD ASSIST SPRING

[75] Inventors: Donald L. Stephens, Los Gatos; Roger Paul Penzotti, Fremont, both of Calif.

[73] Assignee: Pacific Car and Foundry Company, Bellevue, Wash.

[22] Filed: Oct. 28, 1971

[21] Appl. No.: 193,500

[52] U.S. Cl. ............................. 180/69 C, 296/57 A
[51] Int. Cl. ............................................. B62d 25/10
[58] Field of Search ................. 180/69 R, 69 C, 89; 296/57 A

[56] References Cited
UNITED STATES PATENTS
| | | | |
|---|---|---|---|
| 3,174,575 | 3/1965 | May et al. | 180/69 C |
| 3,157,240 | 11/1964 | Chew | 180/69 C |
| 3,232,368 | 2/1966 | Sullivan | 180/69 C |
| 3,556,240 | 1/1971 | Hartman | 180/69 |

FOREIGN PATENTS OR APPLICATIONS
| | | | |
|---|---|---|---|
| 684,973 | 4/1964 | Canada | 180/69 C |

*Primary Examiner*—Leo Friaglia
*Assistant Examiner*—David M. Mitchell
*Attorney*—Richard W. Seed, Carl G. Dowrey and Robert A. Jensen et al.

[57] ABSTRACT

A spring mounted to assist in the movement of a tilt hood for a motor vehicle. The spring is attached to a vertical, relatively fixed element at a point vertically spaced above the pivot point of the tilt hood and applies a constant upward force on the tilt hood. The spring thus lifts the weight off the pivot pin and further is located such that it will assist in movement of the hood from both the fully closed and the fully open position.

6 Claims, 3 Drawing Figures

3,754,613

TILT HOOD ASSIST SPRING

BACKGROUND OF THE INVENTION

In motor vehicles, and particularly in the case of large trucks, the access to the engine is extremely important in order to provide rapid and easy servicing of the vehicle. The rapidity of the service is extremely important in order to keep the vehicle, which is a large investment, in running, revenue-generating service as large a percentage of time as possible.

In order to provide the access required it is necessary to have the engine covering members such as the hood be an extremely large unit or alternatively be sectional such that when service is necessary the entire engine will be exposed. Normally the engine covering or hood of a truck will include not only what is normally termed the hood but also the fenders and related supporting and reinforcing structure all forming part of a pivotable unit. It is thus apparent that the structure to be moved to open the engine cavity is a fairly large structural unit and thus embodies a fair amount of weight. In addition to the size and the inherent weight of the structure which must be moved, the height of the truck above the ground as well as the relative placement of the center of gravity of the hood assembly make it extremely awkward for an individual to apply a great deal of leverage to the hood to open or close the enine compartment.

It has been known in the past to provide assist mechanisms such as hydraulic cylinders or the like to ease the burden of opening and closing the hoods but these devices are undesirable in that they are expensive and relatively complex and thus subject to breakdown.

With the above noted problems and prior art in mind it is an object of the present invention to provide an assist spring for a tilt hood truck wherein the spring provides a constant upward pressure relieving the hinge pin of any unnecessary strain and assists in the opening and closing of the hood with a simple mechanism.

It is another object of the present invention to provide a tilt hood assembly wherein a spring is used to assist in pivoting the tilt hood about its pivot point and a cable is provided which prevents the hood from going beyond the desired position.

DETAILED DESCRIPTION OF THE DRAWINGS

Figure 1:
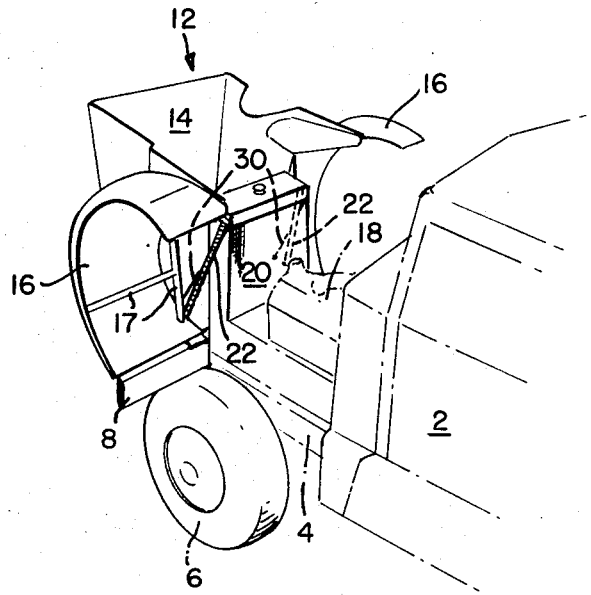
FIG. 1 is an iosmetric view of a typical truck with the tilt hood in the open position showing the relative location of the assist springs and cables which are the subject matter of the present application.

As can be seen in FIG. 1, a typical truck includes a cab which contains the operating mechanism as well as the seat and steering wheel for the driver. The main frame 4 extends beneath the cab and supports an axle upon which the wheels 6 are mounted. At the forward end of the frame there is a bumper 8 and a pivot pin 10 (see FIG. 2) for the tilt hood 12. As shown, the typical tilt type hood for a truck includes the engine covering section 14 as well as the fenders 16 and their supporting framework 17. mounted to the frame and adapted to be covered by the hood 14 and thus protected from the weather or vandalism is an engine 18 and a radiator 20.

Figure 2:
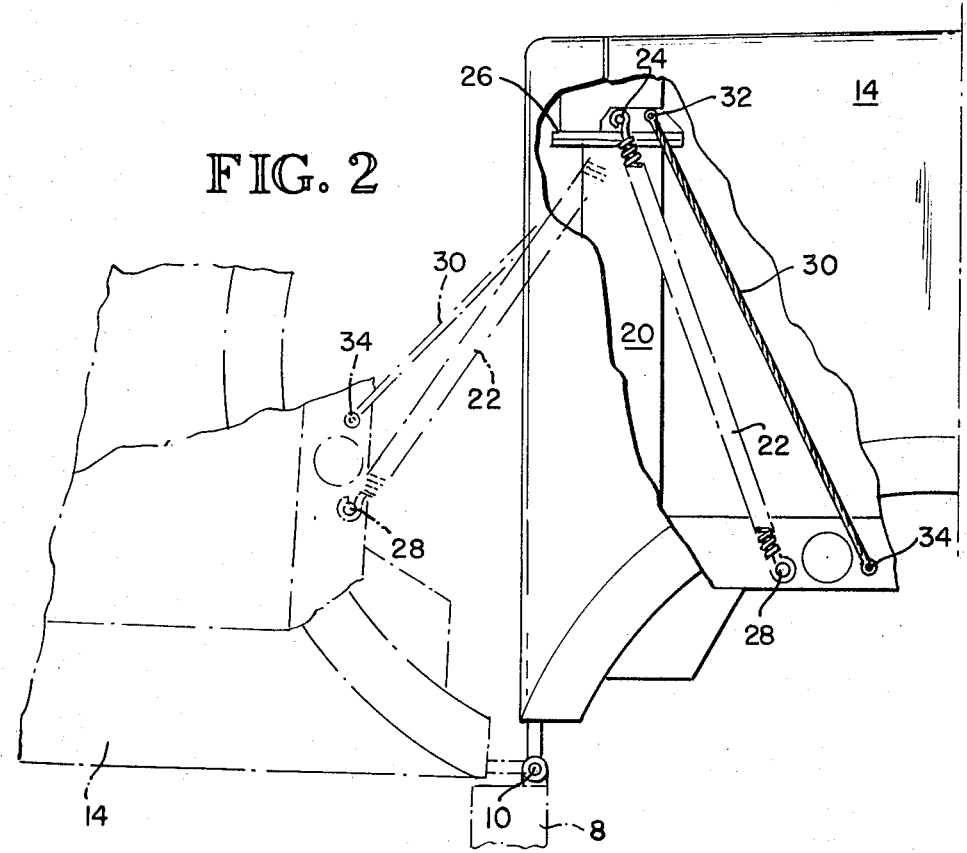
FIG. 2 is an elevational view, partially broken away, showing the tilt hood and assist springs when the tilt hood is in the closed position and likewise shown in phantom relationship when the tilt hood is in the open position.

The inventive assist springs, denoted as 22, are secured to the upper portion of the radiator 20 which is a vertical stable member and to a lower portion of the fender assembly. Referring now to FIG. 2 it can be seen that the springs 22 are mounted by any acceptable means such as bolts or pins 24 to a rigid framing element 26 upon the radiator 20. The springs 22 extend downwardly when in the closed position and slightly rearwardly to pins 28 secured to one of the frame members 17 within the fender assembly. When the hood is in the closed position, the spring is under a slight tension, providing lift to the hood for ease in opening. Mounted slightly aft of the springs 22 are control cables 30 similarly mounted to the upper portion of the radiator by means of pins or bolts 32 and mounted slightly rearwardly of the spring into the fender framework 17 by pins or bolts at the point 34.

When the enginge of the truck needs servicing the hood is pivoted about point 10 and the relative position of points 28 and 34 change but since the spring and the cable do not lie in the same vertical plane but lie in approximately parallel, vertical planes, the cables 30 pass the springs 22 without any interference.

As shown in phantom, the hood is depicted in an open position, at which point the springs 22 again provide upward lift to assist the operator when it comes time to again close the engine compartment. The cables 30 in this position likewise prevent further forward movement of the hood preventing damage thereto.

Figure 3:
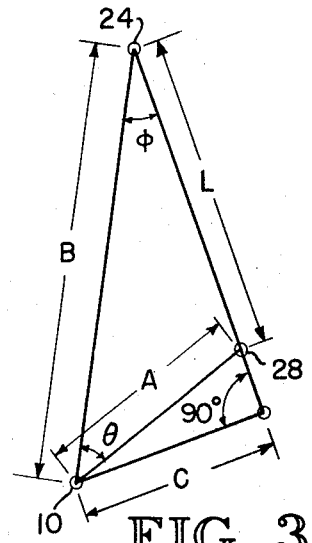
FIG. 3 is a force diagram pertinent to the present structure.

Referring to FIG. 3 and the laws of basic physics and trigonometry it will be remembered that if $F$ = force applied $C$ = the distance from the point to the applied force, then $T$, the torque about a point $= F \times C$ further by the sine law, for FIG. 3

$$\text{Sin } \phi / A = \text{Sin } \theta / L$$

if $F = KL$ then $L = F/K$

So $\text{Sin } \phi / A = \text{Sin } \theta / (F/K)$ but $\text{Sin } \phi = C/B$ so $(C/B)/A = \text{Sin } \theta / (F/K)$ therefore $FC = KAB \text{ Sin } \theta$ which shows that the torque about a pivoted lever the spring located such that $F = KL$, is a simple sine function where $K$ is the spring constant. It is also obvious that the unbalance of a pivoted body is a sine function and the torque ($T$) about the pivot point becomes:

$$T = WR \text{ Sin } \theta$$

where $W$ = weight of the body $R$ = distance from pivot point to center of gravity body $\theta$ = angle from the arm to a vertical reference line Hence, the torque developed by the spring ($FC = KAB \text{ Sin } \theta$) can be made to exactly equal at all tip angles the gravity torque unbalance ($T = WR \text{ Sin } \theta$) of a pivoted body. To provide for necessary unbalance to allow the hood to remain open or closed in the presence of small disturbances like wind or with errors of construction, the spring force in practice is usually made less than the gravity unbalance.

It can thus be seen by a simple efficient mechanism the hood is capable of providing proper coverage and protection for the engine and yet is simply moved from an open to a closed position or vice versa. The spring members are constantly under tension providing an upward lift on the hood at all times taking the weight and inherent friction from the hinge pin thus again assisting in the movement of the hood. With proper adjustment of the length and strength of the spring and proper location within the wheel well of the fender it is possible that the hood could be made completely counterbalancing enabling the placement and retention of the hood assembly in any desired position.

The embodiments of the invention in which an exclusive property or privilege is claimed are defined as follows:

1. A combination of a tilt hood and assist spring for a truck including a supporting framework comprising:
   an engine covering hood pivotally mounted at its front lower portion to a relatively fixed portion of the truck framework,
   means adapted to be covered by said hood extending rigidly upwardly from the framework to a position substantially above the lowest portion of said hood when in either its open or its closed position,
   spring means attached to the hood and to the upstanding means, the point of attachment at the hood in the closed position being below the point of attachment to the upstading means and rearward of the pivotal mounting such that the spring means is under continual tension, serving as a counterbalance for the weight of the hood during movement of the hood from one position to another and further removing stress upon the pivot mounting.

2. The combination of claim 1 wherein the upwardly extending member is the truck radiator. upstanding 3. The combination of claim 1 and further including a cable member independent of said spring means, having its ends attached in close proximity to the ends of the spring means and limiting the amount of extension of the spring means.

4. The combination of claim 1 wherein there is a spring means on each side of the hood.

5. A combination of claim 1 wherein the hood comprises a unit which covers the engine and wheels forming a fender wall and the attachment to.he hood is at the interior of the fender wall.

6. The combination of claim 3 wherein the spring means and cable member are located such that they move from an approximately parallel relative position when the hood is closed to a non-interfering crossed position when the hood is open.

* * * * *